Nov. 19, 1963     J. CORNELL     3,111,120
ENGINE CRANKCASE VENTILATION SYSTEM
Filed Sept. 1, 1961     2 Sheets-Sheet 2
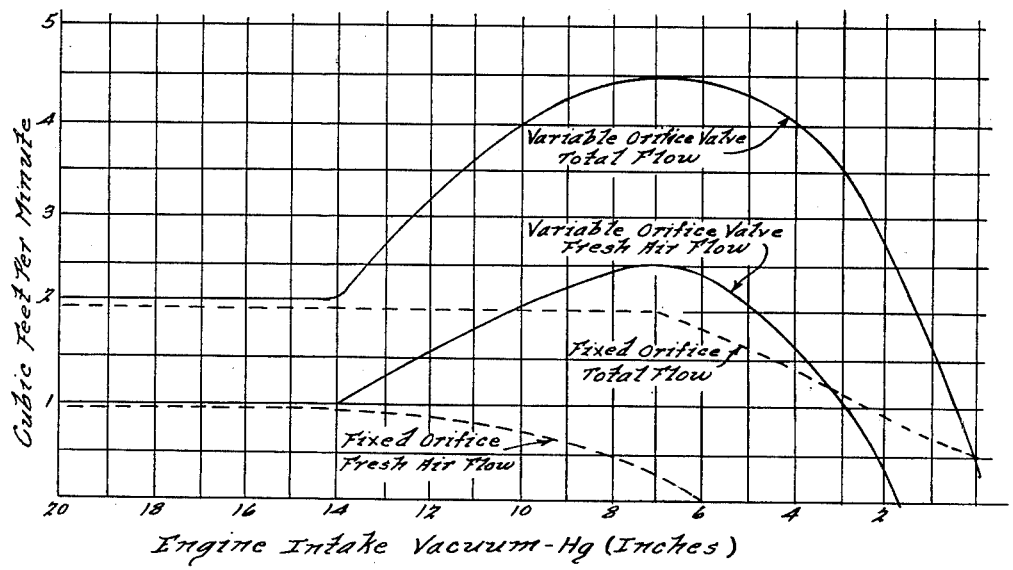
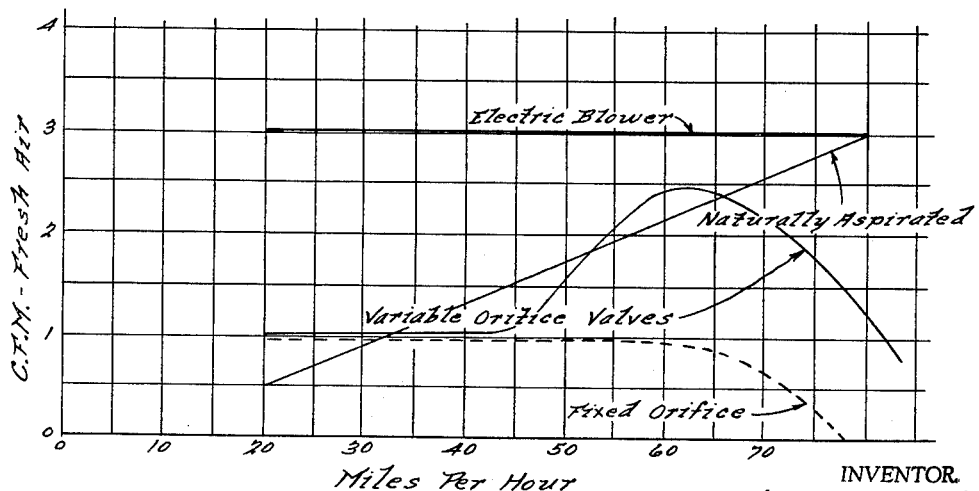
INVENTOR.
Jacob Cornell.
BY
Harness & Harris
ATTORNEYS

United States Patent Office 3,111,120
Patented Nov. 19, 1963

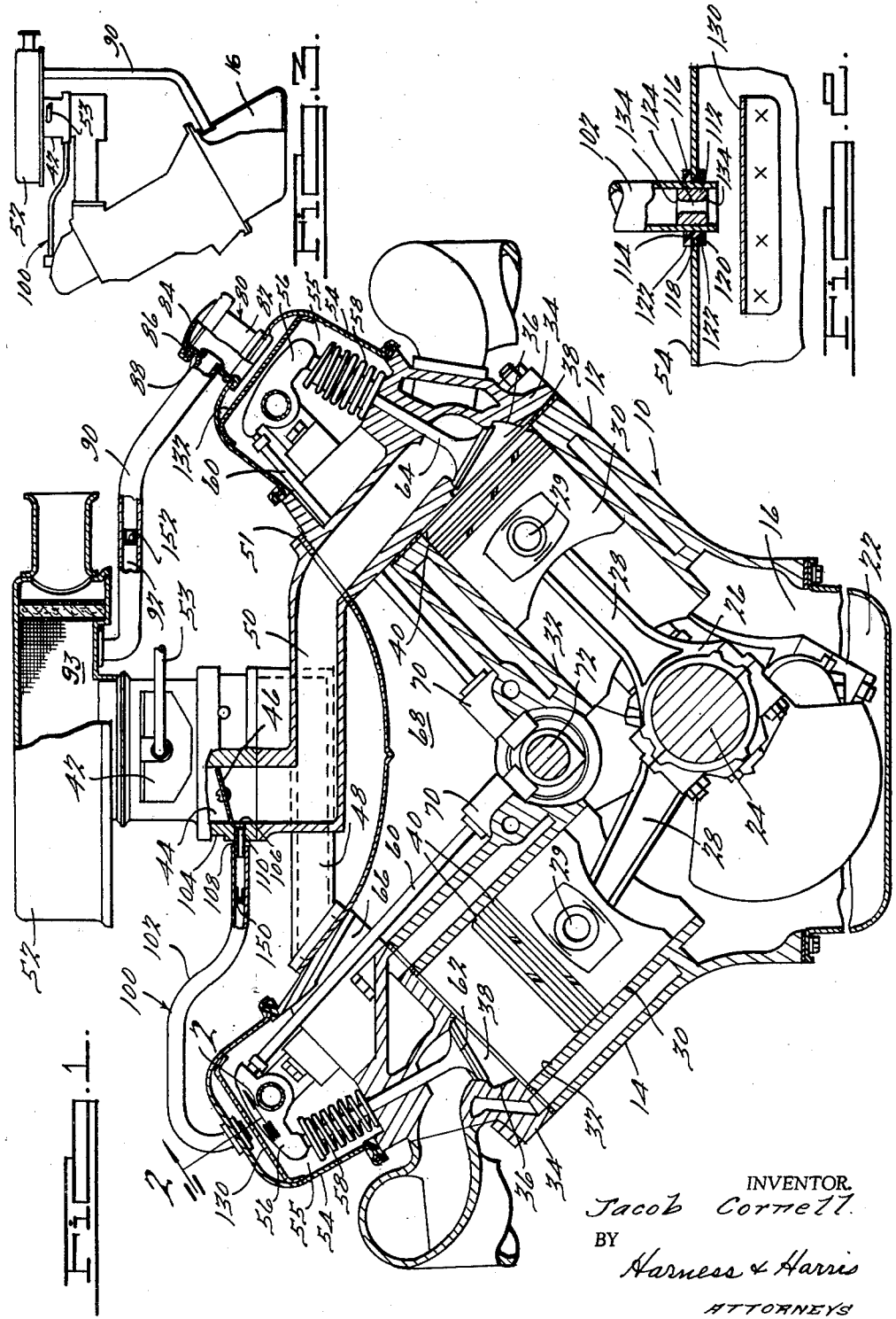

3,111,120
ENGINE CRANKCASE VENTILATION SYSTEM
Jacob Cornell, Huntington Woods, Mich., assignor to Chrysler Corporation, Highland Park, Mich., a corporation of Delaware
Filed Sept. 1, 1961, Ser. No. 135,623
10 Claims. (Cl. 123—119)

This invention relates to engine crankcase ventilation systems, especially to a fixed orifice or throat type of closed crankcase system.

It is known that the blowby gases which escape past the piston rings or through the exhaust valve guides of an engine collect in the interior of the engine where they condense on cold surfaces and cause sludge to form or enter the engine oil to contaminate the same.

The purpose of a crankcase ventilation system is to remove the blowby gases from the inner regions of the engine before the foregoing conditions can occur. Crankcase ventilation is especially important during engine warmup when the engine metal surfaces are cold and therefore readily condense blowby gases and during low speed city type vehicle operation when the oil temperature only reaches a moderate level. Under high speed operation condition the oil gets hot enough to boil off many of the contaminates and the metal surfaces of the engine being hot inhibit condensation of the blowby gases. On the other hand, fresh air is undesirable at this time since it oxidizes the oil.

Many ventilation systems have been proposed or are in use which attempt to resolve the above problems and conditions but none insofar as I am aware have been highly successful or free of other problems. Thus most vehicles today employ a naturally aspirated system of ventilation consisting of a fresh air opening backed by filter material in the cap of the oil filler pipe connecting with the crankcase and an outlet draft tube connecting with the valve mechanism cover of the engine or other areas communicating with the engine crankcase and which has one end extending into the air stream thereby causing a pressure drop and drawing air through the crankcase. Since such a system depends upon vehicle speed to create a pressure drop it provides low ventilation at low speeds and high ventilation (i.e. large amounts of fresh air) at high speeds, a ventilation characteristic just opposite to that desired and which is conducive to dirt intake and substantial oxidation of oil.

It has also been proposed on low speed vehicles such as police cars, taxicabs, and door-to-door delivery trucks to inhibit excessive sludge formation by inducing artificial ventilation of the crankcase by an electric fan to remove the blowby gases from the crankcase. Since a fan provides a constant amount of air under substantial flow throughout the operation it tends to oxidize the hot oil under high speed engine condition. Moreover, if air filtration is not adequate it constantly introduces dirt into the crankcase.

Systems have also been proposed using manifold. These suggest employment of a conduit of uniform section between intake and crankcase providing maximum gas flow by vacuum under all operating conditions or conventionally employ such a conduit including a valve of the type shown in Patents 2,906,252 and 2,716,398 providing variable orifices. Such valves are an improvement over the straight conduit since they provide a restricted orifice and hence less than maximum crankcase ventilation when high manifold vacuum conditions prevail at low speed to thereby prevent excessive fresh air from entering the crankcase but provide an enlarged opening equivalent to a straight conduit and maximum crankcase ventilation at high speeds when the manifold vacuum is low thus permitting a substantial flow of fresh air over the hot oil.

A ventilation system using either structure has undesirable characteristics. The straight conduit facilitates the delivery of excessive amounts of fresh air by vacuum and pulls dirt in through the crankshaft seals and both forms deliver fresh air in quantity to the crankcase at high speeds to oxidize the hot oil and since there is at this time still some measure of vacuum in the crankcase will also pull dirt in through the crankshaft seals to contaminate the soil. Moreover, should the valves stick into open position there also will be excessive air flow into the engine cylinders under idle operating conditions and the idle of the car will become very poor. In addition since a high vacuum condition will prevail in both crankcase and intake at this time oil may also be pulled into the intake system. Moreover, in a construction such as in Patent 2,716,389 all or most of the gas flow is through the central restricted opening at high vacuum and around the outside of the valve member under low vacuum conditions. During the latter period there is a lack of gas flow through the center opening and it becomes readily plugged by blowby products and many subsequently completely stop any ventilation whatever at low speeds. Still other systems provide a conduit between the air inlet to the carburetor and the crankcase. In these systems there is substantially greater air flow at high speeds than at low speed. The effect on the crankcase connection is therefore to provide a big pull at high speeds and excess fresh air and insufficient ventilation at low speeds.

The present invention is directed to a closed crankcase ventilation system providing a gas flow connection, such as a conduit, between a space or chamber of the engine exposed to blowby gases and into which such blowby gases may be moved (such as the crankcase or valve mechanism chambers) and the intake system and downstream of the charge intake (such as the carburetor riser or intake manifold), which connection includes a relatively short throat or restriction with predetermined cross sectional area. Such structure acts to control the gas flow between said space and intake system during low speed and idle operations when high vacuum conditions exist in the intake system whereby maximum ventilation of the crankcase and communicating chambers by fresh air is facilitated without causing excessive gas flow from these chambers into the intake system to cause poor idle speed control and operation. Moreover, this structure acts to prevent fresh air ventilation by vacuum intake as in the case of aforesaid valve structures under high speed conditions when there is low vacuum and substantial blowby to be removed and instead facilitates a building up of pressure in the crankcase whereby the blowby is pushed out through this structure to the intake system and also out of the crankcase to the atmosphere.

In the latter connection it has been observed that in the operation of heavy duty trucks traveling mostly at high speed that it has been possible to maintain an improved condition of the engine oil without the introduction of any fresh air into the crankcase and to merely provide an outlet for any blowby gases. It has been found that under high speed conditions substantial fresh air intake into the crankcase is not only unnecessary but is actually detrimental from the standpoint of dirt intake and hot oil oxidation.

With a ventilation system using the fixed throat or restriction of the present invention there is no fresh air taken into the crankcase at high speed and the blowby gases entering the crankcase during high speed operations will not only pass into the intake manifold through the restriction but will also flow out of the crankcase through an outlet provided therefor, this, by reason of a slight pressure condition being established in the crankcase by reason of the restriction as distinguished from a vacuum condition as in the prior systems. The present invention utilizes this feature to either direct the blowby through the crankcase air inlet to the atmosphere where it is well diluted under high speed condition, or if it is desirable to prevent atmospheric contamination under the high speed condition, to then direct the blowby flow into the carburetor air cleaner for feeding to the engine cylinders. Moreover, at high speeds the slightly pressurized condition of the crankcase functions to prevent dirt from coming into the crankcase past the front and rear crankshaft seals or any other opening in contrast to the vacuum condition that prevails when the aforesaid variable flow valves are employed whereby the vacuum in the crankcase is sufficient to enable dirt to enter the crankcase past these points.

Accordingly, a crankcase ventilation system using the fixed orifice or throat structure of the present invention not only provides the desirable characteristics of sufficient ventilation at low speed vehicle operation and take out of blowby at high speed operation without the use of fresh air but also inhibits oil oxidation by fresh air intake during the high speed operation and prevents the entrance of dirt past the crankshaft seals and other openings under such conditions. Moreover, since it eliminates all moving parts, serious malfunction of the system is entirely avoided.

Accordingly it is a principal object of the invention to provide an engine crankcase ventilation system providing for the removal of blowby gases at all operating speeds of a vehicle to prevent oil contamination and to avoid oxidation of the engine oil by fresh air at high speed operating conditions of the engine when the oil is hot.

Another object is to provide a closed crankcase ventilation system providing a gas flow connection between a space or chamber of the engine through which blowby gases may be moved and the intake system of the engine which connection includes a relatively short throat or restriction of fixed predetermined cross sectional area adapted to provide maximum scavenging of the crankcase of blowby gases at low speeds and high vacuum without causing malfunction of the intake system of the engine and which under high speed operating conditions facilitates removal of blowby gases from the crankcase in part through said connection into the intake system and in part out the fresh air inlet of the crankcase by pressure action.

A further object is to provide a system as in the preceding object wherein under high speed conditions a portion of the blowby gases are delivered to the intake system at a point intermediate the charge intake and the intake passages of the engine cylinders and in part delivered to the air intake of the engine for mixing with the incoming charge.

A specific object is to provide an engine crankcase ventilation ssytem as in the preceding objects wherein the fixed throat or orifice of the connection there referred to is located in the cover of the valve mechanism chamber.

Another specific object is to provide an engine crankcase ventilation system as in the preceding objects wherein the fixed orifice or throat in said connection is located in the wall of the riser of the engine carburetor at a point below the throttle.

Other objects and advantages of the invention will appear from the following description and from the drawings, wherein:

FIGURE 1 is an elevational view partly in section of a V-engine to which the invention has been applied;

FIGURE 2 is a cross sectional view of a fragmentary portion of the cover of the valve mechanism chamber taken at A—A of FIGURE 1 and showing the fixed orifice or throat located in a conduit opening through such cover;

FIGURE 3 is a schematic view of a line engine to which the invention has been applied;

FIGURES 4 and 5 are graphs showing the crankcase ventilation characteristics of an engine as in FIGURE 1 employing the present invention and of other known systems.

Referring to the drawings, FIGURE 1 shows the improved crankcase ventilating system applied to a V-type internal combustion engine generally referred to by the numeral 10 and which as shown includes two opposite banks 12, 14 of cylinders arranged at an angle with respect to each other to form a V, each bank containing one-half the number of cylinders of the engine spaced longitudinally along the length of the engine.

As seen, the engine includes a crankcase 16, formed by the lower portion 18 of the cylinder block 20 and by an oil pan 22 (shown only in part) secured to the block 20 and which also serves as a sump or reservoir for the engine lubricating oil.

Rotatably supported by the cylinder block structure 20 is a crankshaft 24 to which is journaled the lower ends 26 of connecting rods 28. The other ends of the connecting rods 28 are operatively connected by cross pins 29 to pistons 30 (one being shown in each of the banks 12, 14) which are slidable in cylinders 32. A cylinder head 34 is secured to the upper end of each bank 12 and 14 and closes the upper ends of the cylinders 32. The underside of each cylinder head is formed with a plurality of depressions 36, one for each cylinder, each of which is positioned over a cylinder 32 and cooperates therewith and the pistons 30 to form combustion chambers 38.

The pistons 30 are provided with piston rings 40 to prevent insofar as possible the blowing by of gases from the high compression chamber 38 to the crankcase chamber 16. Although these rings are comparatively efficient there is nevertheless some leakage or blowby of gases or vapor which if allowed to condense in the crankcase 16 will contaminate the engine's oil supply and form sludge.

The combustion chambers 38 are fed with a combustible charge from a charge forming device such as a carburetor 42 (a dual carburetor being shown) having a primary riser passage 44 which delivers a mixture of air and fuel under control of a throttle valve 46 to an intake manifold 48 having branch passages 50 connecting with the intake ports and passages 51 of the cylinders combustion chambers 38. Air is drawn into the carburetor by intake suction through a cleaner unit 52 which filters the incoming air. Moreover, the carburetor is supplied with fuel by line 53 from a conventional fuel pump (not shown) connected with a supply source also not shown. The carburetor is provided with a plurality of fuel delivery nozzles (not shown) one of which delivers fuel to the carburetor riser 44 below the throttle 46 for idle engine operation.

Fastened to the top surface of each cylinder head 34 is a sheet metal cover 54 which serves as an air and dirt tight enclosure for the chamber 55 containing the rocker arms 56, valve return springs 58, and other valve mechanism operatively interconnecting the upper ends of the push rods 60 and the intake and exhaust valves 62 and 64 respectively. The push rods 60 extend downwardly through openings 66 in the cylinder heads 34 into the camshaft and tappet chamber 68 where they are operable through tappets 70 by the camshaft 72. The openings 66 also serve as oil drainage openings permitting oil to drain downwardly into the tappet chambers and into the crankcase 16 past the tappet guides and clearance spaces around the camshaft communicating therewith. Hence, both the camshaft and valve mechanism chambers 68 and 55 respectively are in communication with the crankcase 16.

As stated previously, it is the purpose of the present invention to continuously ventilate the various chambers of the engine in such a manner as to inhibit blowby gases and other vapors getting past the piston rings 40 into the crankcase 16 from contaminating the engine oil, and to minimize oxidation of the oil and influx of dirt and the like into the crankcase past the crankshaft bearings and other openings.

I accomplish this by a system functioning during low speed operation of the vehicle to draw clean fresh air into the crankcase 16 to displace blowby gases accumulating therein therefrom and into the intake system of the vehicle for mixing with the combustible charge and which system functions during high speed operations when the oil is hottest and vacuum at a minimum in the intake system to facilitate the establishment of a pressure condition in the crankcase whereby part of the blowby gases are taken into the intake system and part moved into the air intake of the induction system or delivered to the atmosphere.

Although various air intake means may be provided for delivering fresh air into the engine chambers receiving the blowby gases, such as the conventional oil filler pipe having an air inlet and filter, I preferably provide as shown in FIGURE 1 a sealed oil filler structure generally designated by the numeral 80 which includes a filler pipe or tube 82 tightly secure to the valve operating mechanism cover 54 of the engine bank 12 and which opens into the chamber 55, a removable cap 84 adapted by a gasket 86 to seal against a flange 88 of the pipe 82 and provided with a bayonet type lock (not shown) for securing the cap to the pipe.

The tube 82 of the oil filler structure is connected with the carburetor air filter 52 by conduit means 90, providing a passage 92 one end of which opens into the interior of pipe 82 and the other end of which opens into the air filter chamber 93 receiving filtered air. In this manner clean air in sufficient amount is always available and the possibility of taking in dirt at the filler pipe is minimized. Moreover, by employing a sealed filler tube the chamber 55 is tight and suction applied thereto will facilitate the pull of air through the cleaner 52 into the crankcase chamber.

In order to provide suction at low operating speed for pulling air into the engine chambers 16, 55 and 68 for the purpose of scavenging these chambers, especially the crankcase 16 of blowby gases, a suitable conduit connection generally referred to by the numeral 100 is provided between the engine intake system and one of these chambers. Although such may take various forms and be made at different places, as between the crankcase 16 and the intake manifold or inlet passages, it is found preferable in order to minimize oil losses and obtain the greatest pressure differential, to connect the valve mechanism chamber 55 of the bank 14 with the carburetor riser 44 immediately downstream of the throttle blade 46. Thus a suitable conduit 102 which may be in the form of a flexible hose strong enough to resist collapse under intake vacuum and large enough to permit free gas flow without clogging is connected between the rocker cover 54 of the engine bank 14 with the carburetor throttle body 104. This conduit may be made from a synthetic vinyl chloride resin plastic or an elastomeric material such as neoprene, a synthetic butadiene-styrene rubber sometimes called Buna GR–S.

To make the carburetor connection, the carburetor body 104 is preferably provided with a bore or port 106 through the wall thereof which opens into the riser 44 of the carburetor below the throttle 46. Into this bore 106 is tightly fitted a tubular metal sleeve 108 having a central passage 110 also of sufficient size to permit free flow of gases and vapor into the carburetor riser passage without clogging. A passage having a cross-sectional area of that of a bore of about ¼" diameter has been found to be adequate for this purpose. The flexible conduit 102 is tightly fitted over the external body of the sleeve 108 to complete this connection. To further prevent disengagement of the conduit 102 from the fitting 108 it may be cemented in place or provided with a clamp ring not shown.

In order to connect the conduit 102 to the valve chamber cover 54 the opposite end of the conduit 102 is preferably provided with a relatively short tubular metal or plastic insert 112 over which the conduit 102 is tightly fitted and this structure in turn is tightly fitted into a bore 114 of a resilient grommet and seal 116 which in turn is forced into and tightly fits an opening 118 in the cover 54 of the valve mechanism chamber 55. The grommet 116 has an external groove 120 formed by opposite flanges 122 into which the edge portion of the opening 118 is tightly received to seal the same.

An important feature of the invention is to provide in the connection 100 between the chamber 55 and the riser 44 a restriction in the form of a fixed orifice or throat of predetermined cross sectional area for effectuating the novel results described above. In the embodiment of FIGURE 1 this fixed orifice or throat is preferably provided on the tubular insert 112 by making its bore 124 or at least a portion thereof of relatively small predetermined restrictive size. Thus, as shown, the bore 124 constitutes a fixed orifice or throat in the conduit 102 of the connection 100. It will be understood that the orifice or throat 124 may be located any place in the connection 100, for instance such as shown or at the carburetor body. However, the location at the cover 54 is preferred as it is found that in this position there is less tendency of carrying oil out of the air stream into the conduit 102 with the blowby. Moreover, the cover 54 is provided immediately under the orifice 124 with a baffle plate 130 extending the full width of the cover and fastened by suitable means such as spot welding to the side walls of the cover and extending longitudinally of the cover on both sides of the orifice 124. This baffle further facilitates the removal of any oil particles from the air stream with the blowby entering the conduit 102 thereby preventing loss of oil and frequent servicing of the connection 100. Moreover, with the orifice in the cover the blowby has free flow once it passes the same and is not confronted by a restriction before passing the orifice. A similar baffle 132 is provided in the cover 54 of the bank 12 immediately below the inlet connection of the oil filler pipe 80 with the chamber 55, this baffle 132 serving a function similar to that of the baffle 130 when the engine chambers become slightly pressurized under high speed vehicle operation at which time a portion of the blowby is directed out of the pipe 80 into the conduit 92 to the air cleaner 52.

As previously described the size of the fixed orifice or throat 124 is of great importance in the present invention in order to attain the novel results desired. The size of the orifice will vary with the displacement of the engine, the type of fuel employed and other factors where optimum results are desired. It should be large enough to provide adequate scavenging of the engine chambers at low speed operation of the vehicle but not be so large as to permit discharge into the riser 44 during idle speed operations of so large a quantity of blowby diluted with fresh air that it will adversely affect engine idle operation. Finally it must be small enough that it will facilitate the building up of a slight pressure head in the engine chambers during high speed operations of the vehicle when vacuum in the induction system is at its lowest point such that during high speed operation no fresh air will be pulled into the engine chambers, but on the contrary blowby will be pushed out of the engine chambers in part through the orifice 124 to the intake system and in part through the filler pipe 80 to the air filter and thence to the intake system by the pressure created. It has been found that when the orifice is of a proper size a pressure of about 2" of water will be established in the engine chambers under high speed operation and that such is possible with a vacuum equivalent of 6" of mercury in the intake system. With such positive pressure initiated in the engine chambers no fresh air will enter the system through the pipe 80 to oxidize the oil. As a general guide to those utilizing the present invention it may be stated that an orifice having a cross sectional area equivalent to a circular bore between 0.090 to 0.120 inch in diameter will be found operable under nearly all conditions. An orifice of .090" in diameter is considered about minimum and has been successfully used in a V-8 engine of about 318 cu. in. displacement.

It is also preferable that the inlet and discharge edges or lips 134 of the bore 124 be rounded, that the baffle 130 be positioned a sufficient distance, at least about 1/4" from the entrance mouth of the bore 124 or conduit 102, as the case may be to prevent the creation of a high velocity condition of the gases in this area. Moreover, although not required for the performance of the present invention, a backfire screen may be placed in the connection 100 as at 150 and in the conduit 90 as at 152 if desired.

The character of operation of the present invention and the ventilation characteristics obtained will be readily evident from FIGURES 4 and 5 in which the results of low speed and high speed operation are evident and compared with those obtainable with prior systems. Referring to FIGURE 4 wherein ordinates represent gas movement in units of cubic feet per minute and abscissa represent amount of vacuum in the intake system in inches of mercury, it will be seen that during low speed operation when the vacuum in the intake system is high (between 14 to 20 inches of Hg) the fresh air intake in a system employing the variable orifice valve of the aforesaid Patents 2,906,252 and 2,716,398 will be approximately the same as that for the fixed orifice arrangement of the present invention as will the total flow of fresh air and blowby. However, it will be noted that as the engine vacuum is reduced correspondingly to a higher vehicle speed, that the fresh air intake of the variable orifice system continues to rise to a peak in the neighborhood of a vacuum equal to 7" of mercury and then gradually drops off to zero at a vacuum of 1" of mercury. Moreover, that the total flow substantially follows the pattern of the fresh air intake. It is during this period when the oil is hot that the take-in of fresh air is undesirable because of its oxidation effect upon the oil and because any vacuum effect in the engine chambers at this time will also pull in dirt past the crankshaft seals and other openings. In contrast thereto it will be observed that with the fixed orifice system of the present invention the fresh air intake immediately drops as the vacuum is lowered from 14" of mercury and is substantially zero, at a vacuum of around 7" of mercury, when the fresh air intake of the variable orifice system is at a maximum. Moreover, the total gas flow under the fixed orifice system never exceeds that obtained during low speed operations of the vehicle when the vacuum is at a maximum but continues at a substantially uniform level to a vacuum of about 7" of mercury and then gradually drops to a level which is established when the engine chambers become slightly pressurized as described above at which time the blowby is moved through the orifice and also out through the filler pipe 80.

The advantages of the present invention will further be evident from the graphical representations in FIGURE 5 wherein abscissa represent vehicle speed in miles per hour and ordinates cubic feet per minute of fresh air intake. Thus it will be seen that with a naturally aspirated system conventionally in use the fresh air intake increases in proportion to the vehicle speed and hence is at a maximum when the maximum deleterious effect in the hot oil are possible. That by the use of an electric blower the fresh air intake is uniform over the customary operating speeds of the vehicle and is therefore also in excess at high speed. Moreover, in the case of the variable orifice valves of the aforesaid patents the fresh air intake is shown to increase sharply at about 45 m.p.h. speed reaching a maximum at 60 m.p.h. and then gradually dropping. Again it is evident that the quantity of fresh air taken into the engine chambers is largely in excess of that required and an amount which is detrimental to the hot oil. Furthermore, it will be evident from this curve that where the fixed orifice system of the present invention is employed the fresh air intake never rises above the level provided during low speed operation and in fact is below such amount at speeds above about 50 m.p.h. thereby minimizing any oxidation effect.

Referring now to FIGURE 3, this figure schematically shows one manner of applying the present invention employing a fixed orifice ventilation system to a line engine and wherein a connector 100 operating between the valve mechanism chamber cover 54a and the throttle body 104a of the carburetor 42a is shown which is of the same construction and arrangement as that in FIGURE 1 but wherein the fresh air intake is directed from the air cleaner 52a into the crankcase of the engine, the operation being otherwise the same as that described with respect to the engine of FIGURE 1. It will be understood that suitable passages are present in the engine of FIGURE 3 whereby the valve mechanism chamber is in communication with the crankcase to facilitate the movement of blowby gases accumulating in the latter.

From the foregoing description of my invention it will be evident that a novel engine ventilating system has been provided that is free of all moving parts, easy to service and that provides maximum protection for the engine and its oil at all operating speeds of the vehicle. It will be understood that various changes and modifications other than those described will suggest themselves to those skilled in the art without departing from the spirit and intent of the invention and all such changes and modifications as may come within the purview of the appended claims and all equivalents are therefore contemplated.

I claim:

1. An internal combustion engine for an automotive vehicle and the like comprising a plurality of cylinders; a plurality of communicating chambers exposed to blowby gases and into which such gases may move from said cylinders; an intake system including an air intake having a throttle, an intake manifold, and intake passage means for delivering an air fuel mixture to said cylinders; conduit means for introducing fresh air under atmospheric pressure into one of said chambers and a second conduit means interconnecting one of said chambers and said intake system at a point in the latter between said throttle and said cylinders, said second conduit means having a passage of such size and construction as to facilitate the flow of fresh air into said one of said chambers through said first conduit means and flow of blowby gas between said engine chamber with which this second conduit means connects and said intake system when said vehicle is operating at low speeds with said intake system under a vacuum of above about four to ten inches of mercury and facilitating establishment of a pressure above atmospheric pressure in said chamber with which this second conduit connects for substantially limiting said gas flow through this second conduit means to said intake system to blowby gas when said vehicle is operating at high speed with said intake vacuum under about four to ten inches of mercury.

2. An internal combustion engine for an automotive vehicle and the like comprising a plurality of cylinders; a crankcase chamber for receiving blowby gases from said cylinders; additional engine chambers in communication with said crankcase chamber, an intake system including an air intake having a throttle, an intake manifold, and intake passage means for delivering an air fuel mixture to said cylinders; conduit means for introducing fresh air under atmospheric pressure into one of said chambers and a second conduit means interconnecting one of said engine chambers and said intake system at a point in the latter between said throttle and said cylinders, said second conduit means having a passage of sufficient size to permit free flow of blowby gases therethrough without clogging and having a fixed throat-like restriction for controlling said blowby flow into said intake system and of said fresh air into said one chamber and said restriction having a cross-sectional area to facilitate the flow of fresh air into said one of said chambers through said first conduit means and flow of blowby gas between said engine chamber with which this second conduit means connects and said intake system when said vehicle is operating at low speeds with said intake system under a vacuum of above about four to ten inches of mercury and facilitating establishment of a pressure above atmospheric pressure in said chamber with which this second conduit connects for substantially limiting said gas flow through this second conduit means to said intake system to blowby gas when said vehicle is operating at high speed with said intake vacuum under about four to ten inches of mercury.

3. An internal combustion engine for an automotive vehicle and the like comprising a plurality of cylinders; a plurality of communicating chambers exposed to blowby gases and into which such gases may move; an intake system including a carburetor having a throttle valve, an intake manifold communicating with said carburetor and intake passage means communicating with said intake manifold and said cylinders; conduit means for introducing fresh air under atmospheric pressure into one of said chambers, and a second conduit means connecting one of said chambers with said intake system at a point therein intermediate said throttle and said cylinders, said second conduit means defining a passage of sufficient size to permit free flow of blowby gases therethrough without clogging and having a fixed throat-like restriction in said passage for controlling said blowby flow into said intake system and flow of said fresh air into said one chamber, said restriction having a cross-sectional area facilitating said blowby and fresh air flow to said intake system under atmospheric pressure when said vehicle is operating at relatively low speeds with said intake system under a vacuum above about six inches of mercury and facilitating the establishment of a pressure above atmospheric pressure in said chamber with which this second conduit means connects for substantially limiting said gas flow through this second conduit means to said intake system to blowby gas when said vehicle is operating at high speed with said intake vacuum under about six inches of mercury.

4. An internal combustion engine for an automotive vehicle and the like comprising a plurality of cylinders; a crankcase chamber for receiving blowby gases from said cylinders; a valve mechanism chamber in communication with said crankcase chamber; an intake system for delivering an air-fuel mixture to said cylinders including a carburetor having a throttle body, a riser and a throttle valve in said riser, an intake manifold communicating with said carburetor riser, and intake passage means connecting said intake manifold with said cylinders; a cover on said valve mechanism chamber; a fresh air inlet opening into said crankcase chamber, and a conduit interconnecting said valve mechanism chamber through its said cover and said carburetor riser through its said throttle body and below said throttle, said conduit defining a passage for conducting blowby gases from said chambers to said intake system, and a fixed throat-like restriction in said passage for controlling flow of said blowby gases to said intake system and of fresh air into said crankcase chamber, said restriction being adapted to effect a pressure buildup of said blowby gases in said crankcase chamber above atmospheric pressure during high speed operation of the vehicle whereby to discharge blowby gases through said conduit and through said inlet and facilitating discharge of said blowby gases through said conduit under the pressure of atmospheric fresh air flowing into said crankcase chamber through said fresh air inlet during low speed operation of said vehicle under action of vacuum in said intake system.

5. The invention as claimed in claim 4, wherein said restriction has a cross-sectional area in the order of that provided by a circle between about .090" to .120" in diameter.

6. An internal combustion engine for an automotive vehicle and the like comprising a plurality of cylinders; a crankcase chamber for receiving blowby gases from said cylinders; a valve mechanism chamber in communication with said crankcase chamber; an oil filter tube opening into said crankcase chamber and having a removable cap in sealing connection with said tube; an intake system for delivering an air fuel mixture said said cylinders including an air cleaner having a fresh air inlet; a carburetor receiving filtered air from said cleaner and having a throttle body, a riser, and a throttle valve in said riser, and intake manifold and passage means for connecting said riser with said cylinders; a conduit means connecting said air cleaner with said oil filter tube; a second conduit means connecting said carburetor riser below said throttle with said crankcase chamber providing a passage for moving blowby gases from said chambers to said intake system; and a fixed throat-like restriction in said second conduit means for controlling flow of said blowby gases to said intake system and of filtered air into said crankcase chamber through said oil filter tube; said restriction adapted to effect a pressure buildup in said crankcase chamber above atmospheric pressure during high speed operation of the vehicle whereby to discharge blowby gases through said second conduit means to said intake system from said chambers and out through said oil filter tube to said air cleaner, and facilitating movement of said blowby gases through this second conduit means to said intake system under the pressure of air at atmospheric pressure flowing into said crankcase chamber from said air cleaner during low speed operation of the vehicle under action of vacuum in said intake system.

7. In an internal combustion engine including a plurality of cylinders, chamber means for receiving blowby gases from said cylinders, a fresh air inlet connected with said chamber means, and an induction system for feeding an air-fuel mixture to said cylinders including an air intake having a throttle valve, an intake manifold connected with said air intake, and intake passage means connecting said manifold and said cylinders, the improvement which consists in providing conduit means connecting said chamber means with said induction system at a point between said throttle valve and said cylinders for controlling the flow or blowby gases therebetween, said conduit means having a passage of such size and construction such that during low speed operation said flow of blowby gases is affected by fresh air under atmospheric pressure entering said chamber means at said inlet under action of vacuum established in said intake system and during high speed operation said flow is affected by pressures above atmospheric established in said chamber means.

8. The invention in claim 6 wherein said valve mechanism chamber has a cover and wherein said second conduit means connects said cover with said riser and comprises a metal tube mounted in said carburetor body and projecting outwardly from said body and into said riser, a flexible tube having one of its ends snugly fitting said metal tube and its other end provided with a short annular insert having a restricted opening and a flexible grommet mounted in said cover and having a bore tightly receiving said flexible tube and insert.

9. The invention in claim 4 including oil baffle means positioned in confronting relation to said fresh air inlet and to said conduit where it interconnects with said cover.

10. In a ventilating system for crankcases of internal combustion engines and the like having an intake system including a carburetor having a throttle, the combination of chamber means to be ventilated of blowby gases, a first conduit means leading from said chamber means to said intake system downstream of said throttle and second conduit means leading from said chamber means to a source of air, said first conduit means providing a passage constructed and arranged such that both said conduit means and chamber means are subjected to suction at low speeds of said engine whereby blowby gases are drawn into said intake system through said first conduit means from said chamber means and fresh air under atmospheric pressure is drawn into said chamber means through said second conduit means and such that said chamber means is subjected to pressure above atmospheric pressure at relatively higher speeds of the engine when the suction in said intake system is under ten inches of mercury whereby said blowby gases are transmitted out of said chamber means through at least one of said conduit means and flow of fresh air into said chamber means is substantially inhibited.

References Cited in the file of this patent

UNITED STATES PATENTS

| | | |
|---|---|---|
| 2,056,762 | Barr et al | Oct. 6, 1936 |
| 2,906,252 | Beardsley | Sept. 29, 1959 |